Jan. 16, 1940.                S. B. WARD                2,187,002
                            ICE CREAM CABINET
                            Filed Oct. 13, 1937
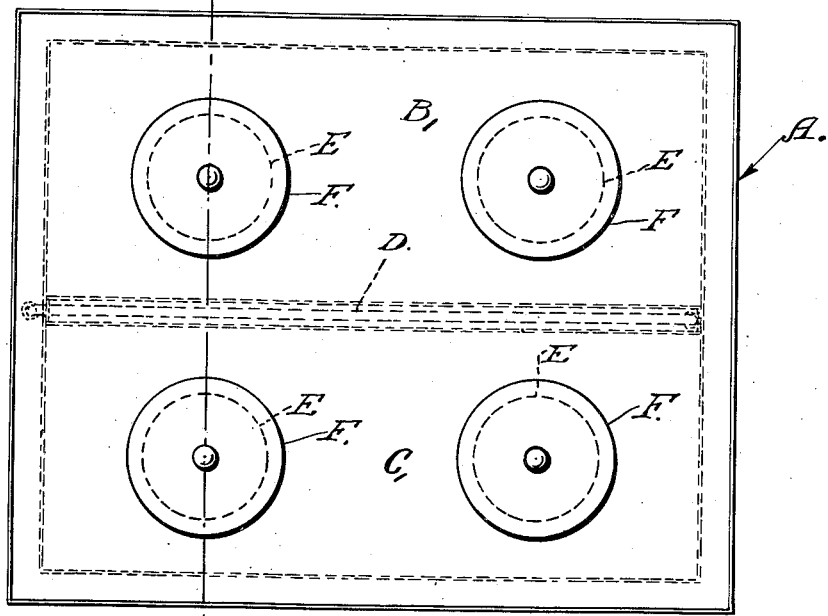
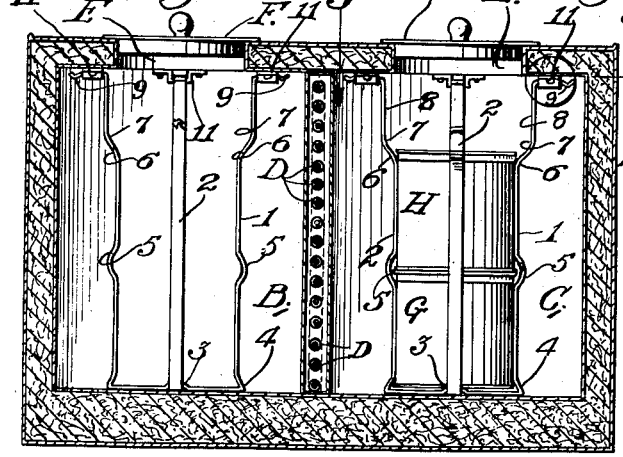
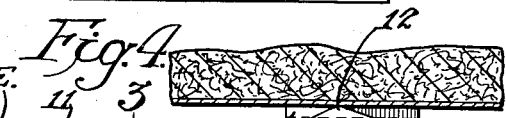
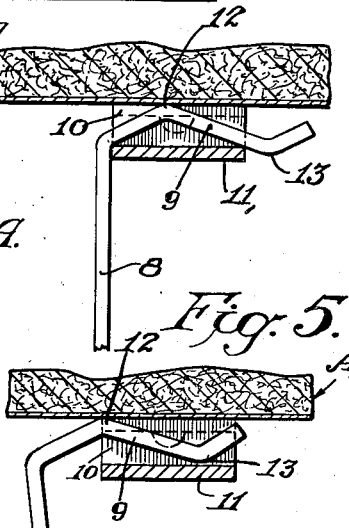
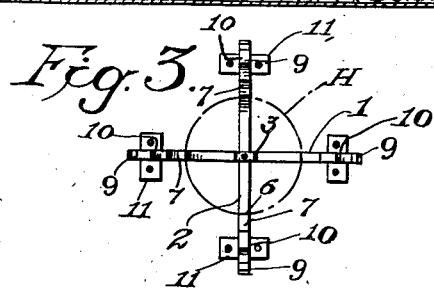
INVENTOR
Samuel B. Ward
BY
ATTORNEY Patented Jan. 16, 1940

2,187,002

UNITED STATES PATENT OFFICE 2,187,002

ICE CREAM CABINET

Samuel B. Ward, Chester Heights, Pa., assignor to H. H. Ward Company, Chester, Pa., a corporation of Pennsylvania Application October 13, 1937, Serial No. 168,709

6 Claims. (Cl. 312—172)

My invention relates to refrigerating cabinets containing compartments for the storage of products such as ice cream or frozen confections which may be packaged in individual units or in bulk containers, and in the use of which the proportions of the products packaged in each way varies from time to time.

In the handling of ice cream in individually packaged units it is desirable to have unobstructed compartment space for the storage thereof, but in the handling of bulk goods it is necessary that the containers be prevented from sliding around in the compartment and held in substantial alignment with the top aperture through which the contents of the container are vended.

My invention involves the provision of a rack for securely holding one or more containers in alignment with a vending aperture, and the provision of means for securely locking the rack to resist the stresses imparted thereto in vending its contents and permitting the ready removal of the rack from the cabinet when desired. Such rack preferably has four up-rights equi-distantly spaced so that the container is held against stress in all directions and provided with zigzag catches so shaped that they may be easily pressed into place in sockets formed by clips permanently fixed to the cabinet, but cannot be removed without a special twist or tilting of the up-rights. The sockets are formed by clips which may be permanently installed without dismantling a cabinet already in use and do not obstruct the storage space. Hence, all of the holes of a cabinet may be equipped with clips and racks inserted only beneath the top apertures through which bulk products are to be vended. Such clips are installed on the under-surface of the sub-top so that they do not obstruct the top apertures but permit free clearance for placing or removing containers in the cabinet. When a rack is installed, its bottom is preferably flush with the bottom of the cabinet so as to provide a firm support for the container and eliminate any stress on the clips from the weight of the contents of the can.

My invention is designed to provide a rack so shaped as to provide a spring action against the sides of a container so as to hold it firmly in place without adjustment and permit the dispensing of bulk ice cream from a can or carton or from the upper can or carton when two or more containers are superposed.

The characteristic features and advantages of my invention will further appear from the following description and the accompanying drawing in illustration thereof:

In the drawing, Fig. 1 is a top plan view of an electric refrigerating cabinet for ice cream; Fig. 2 is a vertical sectional view on the line 2—2 of Fig. 1; Fig. 3 is a horizontal sectional view on the line 3—3 of Fig. 2; Fig. 4 is a greatly enlarged sectional view of the encircling portion of Fig. 2 showing a rack catch in locked position; and Fig. 5 is a view similar to Fig. 4 showing the rack catch in unlocked position.

In the drawing, my improvements are shown applied to a conventional type of ice cream cabinet A containing compartments B and C chilled by suitable refrigerating coils D and to which access may be had through the top apertures E normally closed by the covers F.

My invention is a rack for holding one or more containers in substantial alignment with a top aperture and resisting sidewise thrust imparted to the container in dipping frozen confections therefrom, or otherwise. In its preferred form, the rack comprises a pair of U-shaped strips or yokes 1 and 2 preferably bent from sheet metal and each having substantially parallel arms connected by cross-members at their bottoms. The cross piece of the yoke 1 is bent to form a recess 3 to permit the transverse positioning of the bottom member of the yoke 2 and each of the yoke arms is bent at its bottom to form a groove or recess 4 for the rim or flange of a container or carton when the sides of the latter are engaged by flat portions of the yoke arms. The yoke arms are further bent intermediate their lengths to form curved grooves or recesses 5 to accommodate the cover rim of a bottom carton G and the bottom flange of a top carton H.

At or about the usual level of the top of the upper container, the yoke arms are reversely bent as at 6 and 7 so as to provide a fulcrum at 7 about which the upper section 8 of the arm may be tilted by bending the resilient or spring metal.

The upper end of each section 8 is bent outwardly to form a zigzag catch member 9 lying substantially normal to the section 8 and to the central axes of the aperture E. Each zigzag catch 9 is adapted for engagement in a socket 10 which is open at both ends and preferably formed by securing channeled sheet metal clips 11 to the under-surface of the sub-top. The clips may be secured by soldering, riveting, screws, or other fasteners, to the sub-top, preferably equi-distant from one another around the axes of the top aperture. The zigzag catch is so proportioned to the height and width of its socket that when the section 8 is vertical, the apex formed by the angle 12 engages the top of the socket and the nadir formed by the angle 13 lies beyond the socket and below the lower surface thereof, as shown in Fig. 4. Consequently, stress applied to the rack in a direction normal to its axis will be resisted by the engagement of the catch members with the socket faces. When, however, it is desired to release and remove the rack, each arm section 8 may, in its turn, be tilted around its fulcrum 7 so as to depress the apex and elevate the nadir and permit the catch to slide freely through its socket, as illustrated in Fig. 5.

It is desirable that a refrigerating cabinet be readily adaptable for holding varying quantities of individually packaged ice cream units or large cartons or cans for holding bulk ice cream. When a given area of the cabinet is used for holding individually packaged units, it is undesirable that there be any obstruction in such portion of the compartment, but when such portion of the compartment is to be utilized for holding bulk cartons or cans from which ice cream is dipped, it is necessary that means be provided for holding the cartons in proper position beneath the top aperture and prevent it from sliding around in the compartment. In accordance with my invention, a set of socket-forming clips may be secured around each top aperture without obstructing the compartment, and a rack may be inserted beneath each top aperture or removed, as may be desirable in accordance with the use to which the portion of the compartment beneath any given top aperture is to be put at any given time.

Having described my invention, I claim:

1. In an ice cream cabinet having an apertured top and means forming sockets around said aperture, a container rack having members provided with rigid zigzag catches at their upper ends and extending transversely thereto and engaged in said sockets.

2. In an ice cream cabinet having an apertured top and means forming sockets around said top, a container rack comprising crossed substantially U-shaped members consisting of substantially parallel strips connected at the bottom by a cross member, said strips having outwardly turned catches engaged in said sockets, each of said strips being bent to form a groove adjacent to the cross member and bent to form a groove between the cross member and catch.

3. In an ice cream cabinet having an apertured top, a clip fixed to the underside of the top adjacent to said aperture and forming a socket open at both ends, a container rack having an arm provided at its upper end with a zigzag catch, the apex of such catch normally engaging the top of its socket and the nadir of such catch projecting beyond and below the end of its socket opposite to the arm to which the catch is fixed, said arm being tiltable to lower said apex and elevate said nadir to permit the withdrawal of said catch.

4. A rack for containers having a resilient arm with a rigid zigzag catch at the end thereof and extending substantially normal to the length of said arm adapted for engagement in a socket.

5. A container rack having a flexible arm with a latch at the end thereof extending transversely thereto and means including a keeper irremovably securing said latch against movement toward the vertical center of said rack in one position of said arm and permitting the free sliding of said latch along said keeper when said arm is rocked to a plane at an angle to said position.

6. In an ice cream cabinet having means fixed to the underside of the top thereof and forming horizontally extending sockets, a container rack having arms disposed about an axis and provided with catch members engaged in said sockets, said catch members irremovably engaging said socket means when pulled normally to said axis, and said arms being tiltable to an angle to said axis to disengage said catch members from said socket means.

SAMUEL B. WARD.